United States Patent
Baumgaertner et al.

(10) Patent No.: US 6,251,037 B1
(45) Date of Patent: Jun. 26, 2001

(54) HYBRID DRIVE FOR VEHICLES AND THE LIKE

(75) Inventors: Walter Baumgaertner, Fellbach; Klaus Meier, Leutenbach; Alfons Rennefeld; Jakob Seiler, both of Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/394,904

(22) Filed: Sep. 13, 1999

(30) Foreign Application Priority Data

Sep. 12, 1998 (DE) .............................. 198 41 828

(51) Int. Cl.[7] .............................. F16H 3/72; F16H 37/06
(52) U.S. Cl. .................................. 475/2; 180/65.2; 475/5
(58) Field of Search .................................. 475/2, 1, 3, 4, 475/5, 6; 477/97, 107, 109; 180/65.2, 65.3, 65.4, 65.6, 165; 290/32, 45

(56) References Cited

U.S. PATENT DOCUMENTS 5,823,281 * 10/1998 Yamaguchi et al. ............... 180/65.2
5,856,709 * 1/1999 Ibaraki et al. ........................ 290/45
5,934,395 * 8/1999 Koide et al. ........................ 180/65.2

FOREIGN PATENT DOCUMENTS

| 2436546 | 2/1976 | (DE) . |
| 4124479 A1 | 1/1993 | (DE) . |
| 4407666 A1 | 9/1995 | (DE) . |
| 19717884 A1 | 2/1998 | (DE) . |
| 09175199 | 7/1997 | (JP) . |
| 9-222036 | 8/1997 | (JP) . |

* cited by examiner

Primary Examiner—Sherry Estremsky
Assistant Examiner—Tisha D. Lewis
(74) Attorney, Agent, or Firm—Evenson, McKeown, Edwards & Lenahan, P.L.L.C.

(57) ABSTRACT

A hybrid drive, in particular for vehicles has a variable-ratio gear unit with a branch which can be driven by a primary motor. The gear unit is also connected in a rotationally rigid manner to a rotatable part of a first electric machine. A branch of the gear unit is connected in a rotationally rigid manner to a rotatable rotor of a second electric machine. Another branch connected in a rotationally rigid manner to an output shaft and to which the likewise rotatably arranged other machine component of the first electric machine is connected in a rotationally rigid manner. The rotor of the second machine can be fixed or released for rotation by a brake.

16 Claims, 2 Drawing Sheets

HYBRID DRIVE FOR VEHICLES AND THE LIKE

BACKGROUND OF THE INVENTION

This application claims the priority of 198 41 828.0-22, filed Sep. 12, 1998, the disclosure of which is expressly incorporated by reference herein.

The present invention relates to a hybrid drive, in particular for vehicles, and more particularly, to a hybrid drive containing at least one first electric machine, which can be operated at least as an electric motor; a second electric machine, which can be operated at least as an electric motor and has a nonrotatably arranged stator and a rotor which can be rotated relative to the latter; a variable-ratio gear unit which has a primary-motor input component, which is connected or can be connected to a primary motor, a machine input component, which is connected or can be connected to the rotor of the second electric machine, and an output component, all three parts being arranged so as to be rotatable relative to one another.

A hybrid drive is described in DE-A-24 36 546. In this known drive, a primary motor is connected to a planet carrier of a simple planetary gear unit. The annulus is connected to an output shaft on which a rotor of a second electric machine (motor/generator) is arranged in a rotationally rigid manner. The stator of this machine is arranged nonrotatably in a fixed location.

A central sun gear of the planetary gear unit is connected to a rotor of a first electric machine (motor/generator) in this known drive, the stator of which is likewise arranged nonrotatably in a fixed location. That component (planet carrier) of the planetary gear unit which is connected to the primary motor can be connected directly to the output shaft by a clutch. Depending on the mode in which the hybrid drive is being driven, the two electric machines can each operate as an electric motor or an electric generator. DE-A-41 24 479 and DE-A-197 17 884 describe the same kind of hybrid drive.

In another kind of hybrid drive described in JP-A-09175199, a primary motor is connected to the central sun gear of a simple planetary gear unit. The annulus is connected to an output shaft which is connected in a rotationally rigid manner to the rotor of a second electric machine (motor/generator), the stator of which is arranged nonrotatably in a fixed location. The planet carrier of the planetary gear unit is connected with a rotor of a first electric machine (motor/generator). The stator is likewise arranged rotatably and is connected in a rotationally rigid manner to the sun gear. DE-A-44 07 666 describes a hybrid drive for vehicles with a primary motor arranged in series and two electric machines (motor/generator). A clutch can be used to form a mechanical connection from the primary machine, via the two electric machines, to an output shaft in order to drive the latter without slip in the electric machines.

SUMMARY OF THE INVENTION

An object of the present invention is to provide smaller, more compact hybrid drives with the same transmissible driving power.

To achieve this object, the invention offers two possible solutions, each of which in itself results in a smaller, more compact and more economical constructional unit and the advantages of which are cumulative when they are used together.

Both solutions take as their starting point a hybrid drive, in particular for vehicles, which has at least the following features:

a first electric machine, which can be operated at least as an electric motor;

a second electric machine, which can be operated at least as an electric motor and has a nonrotatable stator and a rotor which can be rotated relative to the latter; and a variable-ratio gear unit which has a primary-motor input component, which is connected or can be connected to a primary motor, a machine input component, which is connected or can be connected to the rotor of the second electric machine, and an output component, all three parts being arranged so as to be rotatable relative to one another.

According to one solution provided by the invention, a brake nonrotatably fixes the rotor of the second electric machine. This has the advantage that, during the process of driving away with the primary motor, this second electric machine does not have to accept several times the motor torque electrically. This reaction torque that has to be accepted via the planetary gear unit can be produced by the mechanical brake. When driving away in the first gear of an automatic gearbox arranged in the drive line, up to about four times the torque of the primary motor occurs as reaction torque which has to be accepted by the electric machine or, in the case of the invention, by the brake. When driving away in a second gear, the torque to be accepted would be reduced to two times to three times the torque of the primary motor. This allows the second electric machine to be of significantly smaller design for the torque to be produced by it in its role as vehicle propulsion drive.

According to another solution, which can be combined with the first solution, the first electric machine is integrated as a double rotation machine into the variable-ratio gear unit, preferably a planetary gear unit. The integration is performed in such a way that the power produced by the primary motor is divided at the primary-motor input component of the variable-ratio gear unit between another component of the variable-ratio gear unit, on one hand, and that part of the first electric machine which is connected in a rotationally rigid manner to the primary-motor input component, on the other hand. The power is then, on the one hand, summed mechanically in the variable-ratio gear unit and, on the other hand, electrically by the first electric machine at the output component. This too results in a more economical, smaller and compact construction and better utilization of space than in the prior art.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
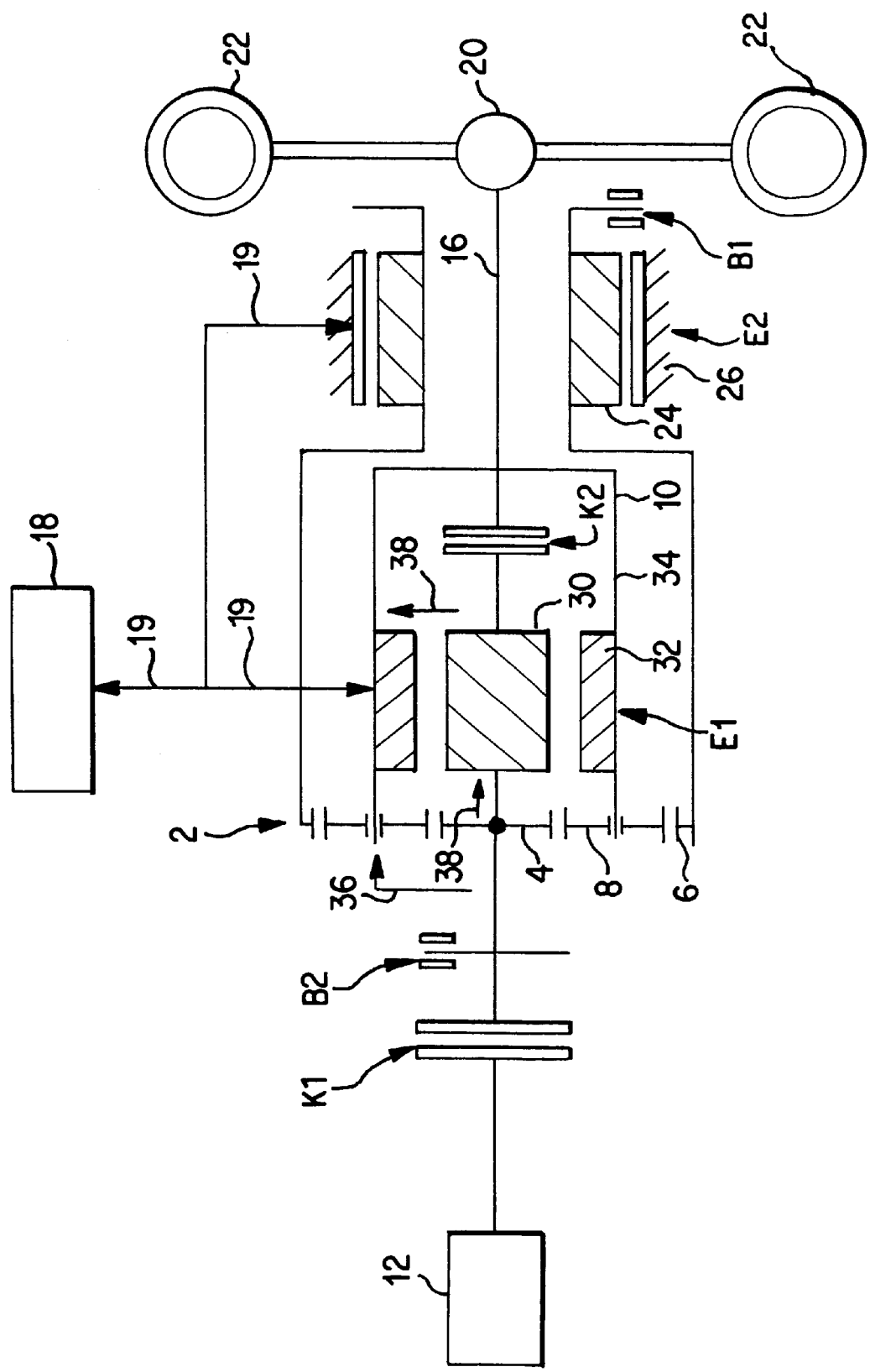
FIG. 1 is a schematic diagram of a hybrid drive according to the invention, in particular for vehicles.
Figure 2:
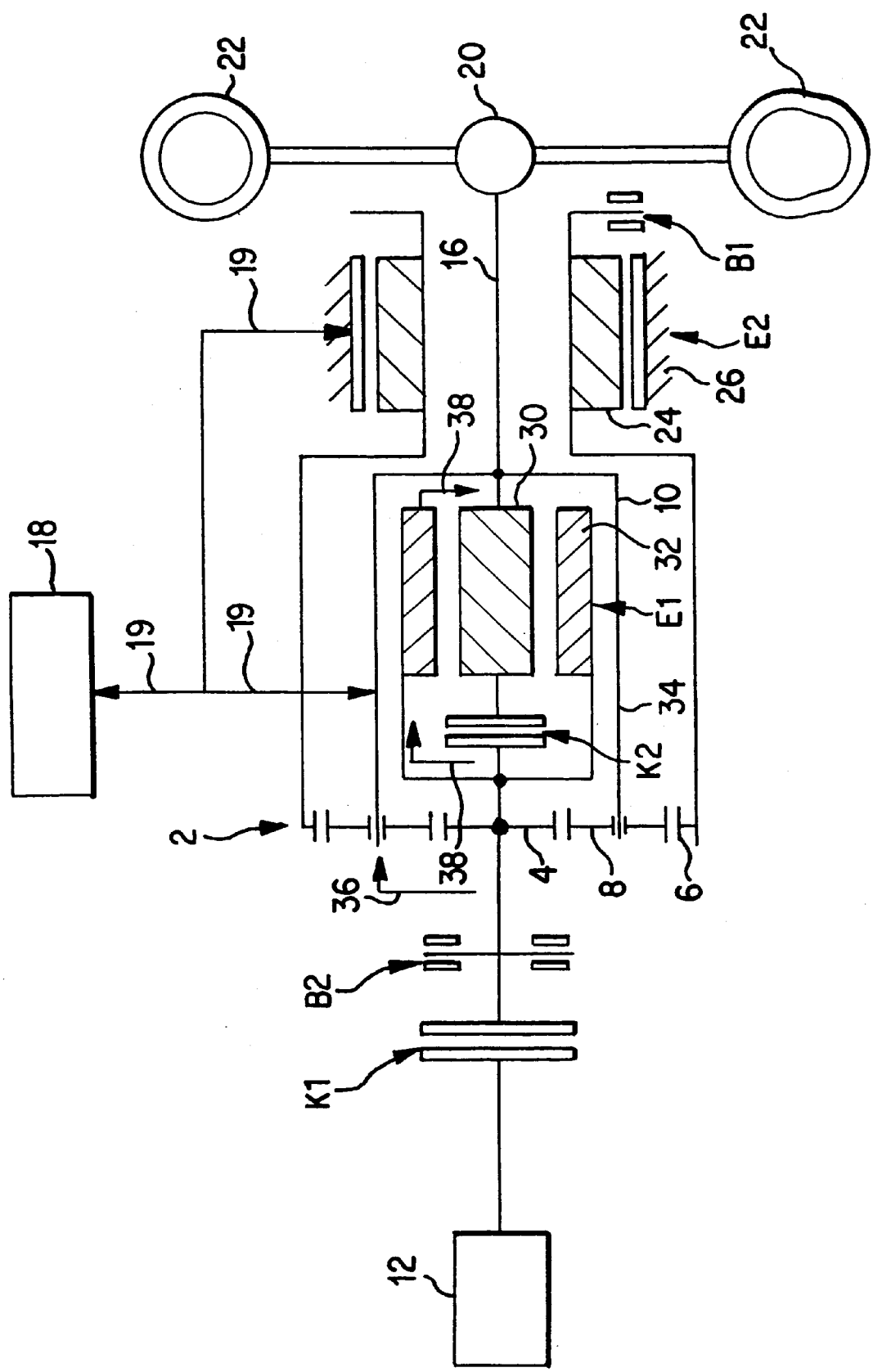
FIG. 2 is a schematic diagram of another embodiment of a hybrid drive according to the invention.

In FIGS. 1 and 2, corresponding elements are in each case provided with the same reference numerals. To this extent, the description of one figure applies also to the other figure.

Other types of epicyclic gear units could be used instead of the variable-speed gear units shown in the drawings.

The two embodiments of the invention shown in FIGS. 1 and 2 have the following common features: a first electric machine E 1, a second electric machine E 2 and an epicyclic gear unit in the form of a simple planetary gear unit 2. The planetary gear unit 2 contains a central sun gear 4, an annulus 6 and, between them, planet gears 8 of a planet carrier 10.

In terms of drive, the sun gear 4 can be connected directly or via a clutch K 1 to a primary motor 12. The primary motor 12 is preferably an internal combustion engine but can also be a turbine or any other kind of motor. The clutch K 1 can be used as a starting clutch. An input shaft 14 that connects the clutch K 1 to the sun gear 4 is preferably provided with a second brake B 2 for optionally fixing the input shaft 14 when the clutch K 1 is open.

When the input shaft 14 is locked by the second brake B 2, an output shaft 16 can be driven by one or both of the electric machines E 1, E 2 as motor, or one or both of these electric machines E 1, E 2 can produce current as generators if they are driven by the output shaft 16. The current in accordance with arrows 19 can be fed into an electrical device 18, for example an energy storage device or a battery, from which the electric machines E 1 and/or E 2 are supplied with power when they are operated as motors.

The output shaft 16 can drive the vehicle wheels 22 via a differential 20, or be driven by these vehicle wheels 22. The output shaft 16 is connected in a rotationally rigid manner to the planet carrier 10.

The annulus 6 of the planetary gear unit 2 is connected in a rotationally rigid manner to the rotor 24 of the second electric machine E 2 and, under the control of a first brake B 1, can be released for rotation or fixed in a nonrotatable manner. The stator 26 of the second electric machine E 2 is nonrotatably arranged in a fixed location. The first brake B 1 can be used as a starting clutch instead of the clutch K 1, whereby, the clutch K 1 remains permanently closed or the input shaft 14 is connected directly to the primary motor 12 in a rotationally rigid manner, without using a clutch K 1 of this kind.

As the vehicle provided with the hybrid drive is driven away with the clutch K 1 as a starting clutch and, indeed, also during driving, the torque produced in the planetary gear unit 2 by the primary motor 12 must be accepted at the annulus 6. This reaction torque is preferably not produced by the second electric machine E 2 but by closing the first brake B 1. Precisely when driving away a vehicle in a low gear of a vehicle gearbox (arranged before or after the planetary gear unit 2), the torque to be accepted at the annulus 6 can be up to four times higher or even higher than the torque produced by the primary motor 12. If the first brake B1 were not used, the second electric machine E2 would therefore have to be constructed for four times the power in order to accept the torque of the primary motor 12. The use of the first brake B1 results in the second electric machine E 2 needing only to be large enough to ensure that it has sufficient power as a motor to drive the vehicle.

The above mentioned vehicle gearbox is preferably an automatic gearbox with a variable reduction ratio. It can be arranged before or after the planetary gear unit 2 in the drive line. The present invention can also be employed without such a gearbox and is moreover not limited to use for land-based vehicles, but can also be used for water-borne vehicles, aircraft and stationary machines.

The first electric machine E1 is a double-rotation machine because its radially inner machine component 30 (rotor) as well as its machine component 32 (stator) situated radially to the outside of this machine component 30 is arranged in a rotatable manner.

In the embodiment shown in FIG. 1, the radially inner machine component 30 (rotor) of the first electric machine E1 is rotationally rigidly connected to the sun gear 4 and, by way of a second clutch K2, can optionally be connected to the output shaft 16 and the planet carrier 10 in a rotationally rigid manner or separated therefrom. Closing the second clutch K2 mechanically establishes a rotationally rigid connection in a rotationally rigid manner and thereby provides a direct drive from the primary motor 12 to the output shaft 16 because the planetary gear unit 2 is then locked. The radially outer machine component 32 (stator) is connected to the planet carrier 10 and hence also to the output shaft 16 in a rotationally rigid manner to achieve common rotation.

In the embodiment shown in FIG. 2, the radially inner machine component 30 (rotor) of the first electric machine E 1 is connected to the planet carrier 10 and the output shaft 16 in a rotationally rigid manner and can be connected by a second clutch K2 to the sun gear 4 and the input shaft 14 in a rotationally rigid manner. As a result, when the second clutch K2 is closed, the planetary gear unit 2 is locked and the primary motor 12 is connected directly in terms of drive to the output shaft 16. The radially outer machine component 32 (stator) of the first electric machine E1 is connected in a rotationally rigid manner to the sun gear 4 and the input shaft 14 of the latter.

In both FIGS. 1 and 2, the components of the hybrid drive are arranged one behind the other in the following sequence: The primary motor 12, the first clutch K1, the second brake B2, the planetary gear unit 2, the first electric machine E1, the second electric machine E2. The electric machine E 1 is integrated into the planet carrier 10. At least the radially inner machine component 30 (rotor) of the first electric machine E1 but preferably the associated radially outer machine component 32 (stator) as shown in FIGS. 1 and 2, is arranged radially inside of webs 34 of the planet carrier 10, on which webs 34 the planet gears 8 are rotatably arranged.

As shown in FIGS. 1 and 2, the first brake B1 is preferably arranged on that side of the second electric machine E2 which faces away from the planetary gear unit 2. Depending on which of the clutches K1 and/or K2 and/or the brakes B1 and/or B2 is/are open or closed, the output shaft 16 can be driven solely by the primary motor 12 or by just one or by both of the electric machines E1, E2 or by all three drive units. The electric machines E1 and/or E2 can also be driven by the output shaft 16 and act as generators, or the first electric machine E1 can be driven by the primary motor 12 and act as a generator.

In both embodiments shown in FIGS. 1 and 2, the output produced by the primary motor 12 is, on one hand, distributed mechanically from the sun gear 4, via the planet wheels 8, to the planet carrier 10 and, on the other hand, electrically from the sun gear 4, via the first electric machine E 1 to the planet carrier 10, as indicated by arrows 36, 38.

If the sun gear 4 is held fast so that it does not rotate, either by the second brake B 2 or the primary motor 12, the output shaft 16 can be driven in a purely electrical manner by one electric machine E 1 and/or the other electric machine E 2. If the output shaft 16 is driven simultaneously by both electric machines E 1 and E 2, their outputs are added together at the planet carrier 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle drive, comprising at least one first electric machine configured to be operated at least as an electric motor; a second electric machine configured to be operated at least as an electric motor and having a nonrotatably arranged stator and a rotor rotatable relative to the stator; a variable-ratio gear unit having a primary-motor input component connectable to a primary motor, a machine input component connectable to the rotor of the second electric machine, and an output component, the components being rotatably arranged relative to one another; and a brake operatively arranged for selectively nonrotatably fixing the rotor of the second electric machine.

2. The hybrid vehicle drive according to claim 1, wherein the brake is a starting clutch configured to start up the output component with the motor input component of the variable-ratio gear unit rotationally rigidly connected to the primary motor.

3. The hybrid vehicle drive according to claim 1, wherein a starting clutch is arranged upstream, in drive terms, of the motor input component of the variable-ratio gear unit.

4. The hybrid vehicle drive according to claim 1, wherein a stator and a rotor of the first electric machine are each a rotatably arranged machine component, of which one machine component is rotationally rigidly connectable to the engine input component and the other machine component is rotationally rigidly connectable to the output component of the variable-ratio gear unit.

5. The hybrid vehicle drive according to claim 4, wherein the variable-ratio gear unit has an input side facing the position of the primary motor and an output side facing away therefrom, and the two machine components of the first electric machine are arranged on the output side of the gear unit.

6. The hybrid vehicle drive according to claim 4, wherein the engine input component and the output component of the variable-ratio gear unit are connectably arranged with respect to one another and are separated by a clutch therebetween.

7. The hybrid vehicle drive according to claim 6, wherein the variable-ratio gear unit has an input side facing the position of the primary motor and an output side facing away therefrom, and the two machine components of the first electric machine are arranged on the output side of the gear unit.

8. The hybrid vehicle drive according to claim 2, further comprising a brake operatively arranged for nonrotatably fixing the input component of the variable-ratio gear unit.

9. The hybrid vehicle drive according to claim 1, wherein the variable-ratio gear unit is a planetary gear unit having at least one central sun gear, a planet carrier with planet gears and an annulus.

10. The hybrid vehicle drive according claim 2, wherein the motor input component is the sun gear, the machine input component is the annulus and the output component is the planet carrier of the planetary gear unit.

11. The hybrid vehicle drive according to claim 10, wherein a starting clutch is arranged upstream, in drive terms, of the motor input component of the variable-ratio gear unit.

12. The hybrid vehicle drive according to claim 11, wherein a stator and a rotor of the first electric machine are each a rotatably arranged machine component, of which one machine component is rotationally rigidly connectable to the engine input component and the other machine component is rotationally rigidly connectable to the output component of the variable-ratio gear unit.

13. The hybrid vehicle drive according to claim 12, wherein the variable-ratio gear unit has an input side facing the position of the primary motor and an output side facing away therefrom, and the two machine components of the first electric machine are arranged on the output side of the gear unit.

14. The hybrid vehicle drive according to claim 13, wherein the engine input component and the output component of the variable-ratio gear unit are connectably arranged with respect to one another and are separated by a clutch therebetween.

15. The hybrid vehicle drive according to claim 14, further comprising a brake operatively arranged for nonrotatably fixing the input component of the variable-ratio gear unit.

16. The hybrid vehicle drive according to claim 15, wherein the variable-ratio gear unit is a planetary gear unit having at least one central sun gear, a planet carrier with planet gears and an annulus.

* * * * *